United States Patent
Mack et al.

(10) Patent No.: US 6,706,081 B2
(45) Date of Patent: Mar. 16, 2004

(54) DECORATIVE CANDLE

(75) Inventors: Karen Mack, Scottsdale, AZ (US); DeAnn Davis, Fountain Hills, AZ (US)

(73) Assignee: The Dial Corporation, Scottsdale, AZ (US)

( * ) Notice: Subject to any disclaimer, the term of this patent is extended or adjusted under 35 U.S.C. 154(b) by 242 days.

(21) Appl. No.: 09/846,698

(22) Filed: Apr. 30, 2001

(65) Prior Publication Data

US 2002/0024168 A1 Feb. 28, 2002

Related U.S. Application Data

(60) Provisional application No. 60/200,217, filed on Apr. 28, 2000.

(51) Int. Cl.$^7$ ................................................ C11C 5/00
(52) U.S. Cl. .......................................... 44/275; 431/288
(58) Field of Search ............................ 44/275; 431/288

(56) References Cited

U.S. PATENT DOCUMENTS

| | | | |
|---|---|---|---|
| 3,645,705 A | 2/1972 | Miller et al. | |
| 4,990,013 A | 2/1991 | Hejmanowski | 401/49 |
| 5,261,952 A | 11/1993 | Craig | 106/19 B |
| 5,294,657 A | 3/1994 | Melendy et al. | 524/270 |
| 5,383,954 A | 1/1995 | Craig | 106/19 B |
| 5,783,657 A * | 7/1998 | Pavlin et al. | 528/310 |
| 5,879,694 A * | 3/1999 | Morrison et al. | 424/405 |
| 5,882,363 A | 3/1999 | Spaulding et al. | 44/275 |
| 5,976,446 A | 11/1999 | Lin et al. | 264/328.14 |
| 5,998,570 A * | 12/1999 | Pavlin et al. | 528/310 |
| 6,066,329 A * | 5/2000 | Morrison et al. | 424/405 |
| 6,129,771 A * | 10/2000 | Ficke et al. | 44/275 |
| 6,200,129 B1 * | 3/2001 | Sullivan et al. | 431/126 |
| 6,210,153 B1 * | 4/2001 | Freeman et al. | 431/291 |
| 6,299,435 B1 * | 10/2001 | Freeman et al. | 431/291 |
| 6,423,324 B1 * | 7/2002 | Murphy et al. | 424/401 |
| 6,439,880 B1 * | 8/2002 | Ray | 431/288 |
| 6,450,802 B1 * | 9/2002 | Steck | 431/288 |
| 6,471,731 B1 * | 10/2002 | Elliott et al. | 44/275 |
| 6,475,609 B1 * | 11/2002 | Whitney et al. | 428/212 |
| 6,478,830 B2 * | 11/2002 | Allison et al. | 44/275 |
| 6,491,517 B2 * | 12/2002 | Freeman et al. | 431/291 |
| 6,544,302 B2 * | 4/2003 | Berger et al. | 44/275 |
| 6,551,365 B2 * | 4/2003 | Berger et al. | 44/275 |

FOREIGN PATENT DOCUMENTS

WO    WO 99/27042    6/1999

* cited by examiner

*Primary Examiner*—Margaret B. Medley
(74) *Attorney, Agent, or Firm*—Snell & Wilmer LLP

(57) ABSTRACT

Disclosed is a decorative candle containing a glitter material and a suitable candle matrix. The glitter material is selected so as to minimize safety, regulatory or toxicity concerns, such as may exist with the use in candles of conventional glitter materials. The glitter material is further selected such that conventional candle matrices and conventional processing techniques can be utilized for preparation of the decorative candle.

4 Claims, No Drawings

DECORATIVE CANDLE

RELATED APPLICATIONS

The present patent application claims the benefit of, and priority to, U.S. Provisional Patent Application Ser. No. 60/200,217, entitled "Glitter Candle," filed Apr. 28, 2000, the entire contents of which is hereby incorporated by reference.

FIELD OF THE INVENTION

This invention generally relates to candles, and more particularly, to candles having decorative material dispersed therein.

BACKGROUND OF THE INVENTION

Candles have become popular for decorative purposes, and as such are being formed in a wide variety of styles, shapes, and colors.

There are generally three different classes of candles: tapered, pillar and container. A container candle may be formed, for example, by pouring molten matrix material into a container having a wick disposed therein. The wick extends through the matrix such that as the wick is burned, the matrix material around the wick will melt thereby providing fuel for the wick to burn. A pillar candle is commonly formed by pouring the melted matrix into a mold, wherein the mold preferably contains a wick. The matrix is allowed to cool such that it solidifies and is then removed from the mold, thereby forming a free-standing or "pillar-type" candle. A tapered candle may be formed by repeatedly dipping a wick into melted matrix material. Each time the candle is dipped into the melted matrix material, the melted matrix material adheres to the cooled matrix already formed about the wick, thereby forming the tapered candle. Many variations on these general processes have been developed over time and are being practiced.

Fragrances and/or coloring agents are often added to the candle matrix to give the candle a unique appearance. Typically, the fragrance and/or pigment is mixed with the wax when in a molten state. The wax containing the fragrance and/or pigment is then formed into the preferred type of candle. The pigment will give the candle a desired coloring, while the fragrance gives the candle a preferred scent.

Often, candlemakers incorporate extraneous material into the candle matrix for visual appeal. The incorporation of certain extraneous material, however, can present issues relating to safety, regulatory, and toxicity concerns, both in the pre-ignition and ignition states of the candle.

Glitter and glitter-type materials have been incorporated into a variety of applications for its visually appealing effects. Exemplary applications include paints, glues, crayons, and cosmetic-based applications such as lotions, lip balms, bath products, etc. These applications have tended to use glitter materials, and reflective flakes, comprising metallic and non-metallic materials. For example, metallic-based glitter as used in many of these applications includes particles or flakes of base metals including aluminum, brass, copper, gold, and silver. Further, non-metallic formulations have included particles or flakes of cellulose, acetate, poly(ethylene terephthalate), polymethacrylate, poly(vinylbutyral), and the like. More recently, metalized glitters have been used comprising a reflective material coating, such as a metal coating, on a suitable substrate, such as a polymer or other solid organic substrate. Examples of these type include coated metallized materials such as coated aluminum metallized cellulose acetate, metallized poly(ethylene terephthalate), polymethacrylate, poly(vinylbutyral), and the like.

Glitter compositions found in other applications, however, may not be appropriate for the unique requirements of candle operations. Specifically, when glitter materials are used in candle matrices, emission characteristics, among other things, in both the ignition and pre-ignition states of the candle should be considered. Combustion and the high heat environment of candle matrices in operation may create safety, regulatory, and toxicity concerns relating to specific components of certain common glitter formulations. For example, some glitter formulations may comprise substantial quantities of heavy metals such as lead, mercury, cadmium, and arsenic. The present inventors have found that such glitter materials may give rise to toxic emissions in the preignition, ignition and/or burn/combustion states. Other glitter type formulations may also comprise other materials, which may present additional safety issues, apart from thermal reactivity concerns, such as handling, safety, and the like.

In addition, of course, glitter formulations are also driven by marketing considerations such as consumer preferences and acceptability of glitter materials and its visual impact on the candle product. Moreover, the type of glitter materials chosen may also affect processing feasibility, based on particle size and weight, processing parameters, and mixing requirements.

Thus, a need in the art exists for the identification of a suitable glitter materials for use in candles that are visually appealing and easily processable, and that avoid the disadvantages that can be associated when conventional glitter materials are incorporated into candle matrices.

SUMMARY OF THE INVENTION

While the way in which the present invention addresses the disadvantages of the prior art will be described in greater detail hereinbelow, in general, in accordance with various aspects of the present invention, glitter materials are selected for incorporation into a candle matrix, which glitter materials are selected so as to not likely give rise to such safety, regulatory or toxicity concerns as may exist when conventional glitter materials are incorporated therein. Moreover, such glitter materials are appropriately selected such that conventional candle matrices and conventional processing techniques can be utilized to prepare the decorative candles of the present invention having glitter materials dispersed therein.

DETAILED DESCRIPTION OF EXEMPLARY EMBODIMENTS

The following descriptions are of exemplary embodiments of the invention only, and are not intended to limit the scope, applicability or configuration of the invention in any way. Rather, the following description is intended to provide convenient illustrations for implementing various embodiments of the invention. As will become apparent, various changes may be made in the function and arrangement of the elements described in these embodiments without departing from the scope of the invention.

In accordance with various aspects of the present invention a decorative candle composition is provided which comprises a candle matrix and a suitable glitter formulation, such that the glitter formulation incorporated into a candle matrix is safe. Preferably, the glitter material is capable of withstanding high heat and/or combustive environments without producing harmful or toxic effects.

As used herein, "candle matrix" refers to any base material from which the candles of the present invention can be made. While exemplary candle matrices will be described herein, it should be appreciated that a variety of candle matrices are contemplated by the present invention, for example, polymers, polymer resins, petroleum-based waxes, natural beeswax, vegetable waxes, synthetic waxes, gels, styrene rubbers, and other now known or later developed materials suitable for use in candles.

In accordance with various aspects of the present invention, a decorative polymer, metallic, or other material having reflective and/or iridescent characteristics is suitably incorporated into the candle matrix. Suitable glitter formulations, in accordance with various aspects of the present invention, are preferably those formulations that are safe, or are substantially free of toxins and heavy metals, or are comprised primarily of polyesters, copolyesters, aluminum, silicon, and/or mica based materials.

Turning first to the candle matrix as noted above, it may comprise virtually any base material suitable for use in candles. Preferably, the candle matrix material selected can effectively suspend the desired glitter material in accordance with the present invention. Moreover, preferably, the candle matrix is chosen such that candles made in accordance with the present invention do not darken or smoke while burning. However, virtually any candle matrix now known or hereafter devised may be utilized in accordance with the present invention.

For purposes of illustration only, and without limitation, specific reference to two preferred types of candle matrices-a solid, transparent candle matrix, and an opaque, wax-based matrix will be herein described. The candles of the present invention may be formed in other types, for example, they may be self-supporting (i.e., tapered or pillar), or may be formulated to be poured into and burned from a container or other external support.

Transparent Candle

In one embodiment of the present invention, the candle composition comprises a combination of a solid, transparent candle matrix and a suitable glitter material.

The formulation for an exemplary transparent candle matrix includes one or more gellants, a solvent, and one or more co-solvents, mixed together. This exemplary candle matrix is liquid at elevated temperatures, such as those experienced when candles manufactured from the matrix are lighted, but is solid at room temperature.

The gellant material preferably is soluble in the solvent at elevated temperatures, and at room temperature after cooling. Preferably, the gellant comprises polyamide resins and derivatives thereof. More preferably, the gellant is the polyamide resin UNICLEAR® 80, available from Union Camp/International Paper of Purchase, N.Y., which consists of 80% UNICLEAR® ester-terminated polyamide resin and 20% mineral oil. The total amount of gellant preferably totals approximately 25–35% by weight of the composition.

The candle matrix of this embodiment of the present invention also preferably includes one or more solvents, preferably totaling about 30–40% by weight of the candle composition. Most preferably, the amount of solvent exceeds the amount of gellant in the candle matrix. The solvent serves to soften the gellant, to lower the melting point of the matrix, and to ease processability of the matrix. A variety of solvents are known in the art, including, but not limited to, mineral oil, paraffin oil, olive oil, soy bean oil, silicone, isocetyl stearate, C12–C15 alkyl benzoate, decyl oleate, cetearyl octanoate, castor oil, glyceryl oleate, octyl palmitate, and myristyl ether propionate.

In a preferred candle matrix in accordance with this embodiment of the present invention a co-solvent also is employed to aid in improving dispersion of the gellant in the matrix, and increasing clarity and hardness of the matrix. The co-solvent may be a fatty acid salt/soap, such as capric/caprylic triglyceride. Other fatty acid esters of intermediate chain length (e.g., C8–C12) may also be useful as co-solvents. The amount of the co-solvent may vary, but is preferably approximately 20–30% by weight of the candle composition.

A preferred transparent candle matrix in accordance with this embodiment of the present invention comprises, in addition to the above components, a combination of ingredients to optimize the physical properties of the matrix. For example, a freezing point depression agent, such as hexylene glycol or similar anti-freeze compositions, may be added to improve the freeze/thaw profile of the candle matrix and thus improve the shelf life of the final product. Preferably, the freezing point depression agent is from about 0% to about 10% by weight of the composition. Excessive amounts of freezing point depression agents may, however, cloud the matrix, and may increase the potential for safety, regulatory, and toxicity problems. Also, a fatty acid may be added to increase hardness and/or processability of the matrix. Such fatty acids may include, lauric acid, myristic acid, palmitic acid, stearic acid, and mixtures thereof, or comparable fatty acids of similar chain length (e.g., C14–C18). Finally, a variety of additives, such as fragrances, coloring agents, preservatives, UV inhibitors, antioxidants, etc., may be added. Typically, the total amount of these additives will be less than 25% by weight of the total composition, and preferably less than 5% of the total composition.

Preferably, the composition has a high degree of clarity, with little or no haze or cloudiness, and more preferably the composition is crystal clear, even when fragrances or coloring agents have been added, such that the glitter material is clearly visible through the candle matrix. A preferred candle matrix that exhibits these characteristics is available from Bush Boake Allen of Montvale, N.J., under the brand name OPTISCENT™.

Opaque Wax-Based Candle

In accordance with a further embodiment of the present invention, the candle matrix comprises a blend of petroleum-based paraffin waxes and other additives that results in a "traditional," opaque candle matrix. The combination of paraffin waxes may be chosen to impart a specific set of finished product attributes, including melt point, oil content, creaminess, opacity, hardness, fragrance stability, color stability, and ease of manufacture. For example, for poured candles (i.e., candles poured into and supported by containers, such as glasses, pots, and tins), a low melting point (e.g., from approximately 125–138° F.) wax or wax blend having a high oil content is preferred. On the other hand, for example, for molded free-standing candles, such as tapers and votives, a higher melting point (e.g., from approximately 139–143° F.) wax or wax blend having a lower oil content is preferred.

In accordance with a preferred aspect of this embodiment of the present invention, microcrystalline wax and/or synthetic wax (polymerized alkenes) are added to the paraffin wax-based candle matrix to achieve desired candle characteristics. These additives serve as hardening agents and fragrance stabilizers, and may be added in various amounts. For example, if the desired final form of the candle composition is as a container candle, only a small amount of these additives is preferred. On the other hand, if a molded or taper candle is desired, a greater amount of these additives may be included to increase the hardness of the matrix and allow a self-supporting candle to be formed.

Further, a variety of other additives may be employed to impart desired characteristics to the candle matrix, including fragrances, coloring agents, UV inhibitors, antioxidants, preservatives, and the like.

Into each of these candle matrices of each of these exemplary embodiments a glitter material is preferably dispersed. As noted above, such glitter materials are suitably selected so as to be safe.

Safe glitter formulations are those formulations that do not produce harmful or toxic emission products both in the pre-ignition and ignition states of the candle. Emissions from suitable glitters should not contain large quantities of harmful gasses, such as carbon dioxide, carbon monoxide, nitrous oxide, cyanide gas, and other like compounds. Such harmful or toxic emission products may be identified under contaminant standards set forth, by way of a nonlimiting example, under the Occupational, Safety & Health Administration (OSHA), as provided in 29 C.F.R. §1910.1000.

Safe glitter formulations additionally include those formulations that are safe to handle under normal household conditions. For example, preferably the glitter materials are suitably proportioned to minimize sharp edges. Nevertheless, in accordance with the present invention, the glitter materials may be provided in a full range of particle shapes and sizes. Indeed, the glitter material may take a variety of forms, for example, small, amorphous flakes, precision-cut glitter particles in various shapes and sizes, and even continuous sheets of glitter material that may wrap or cover the surfaces of the candle matrix.

Suitable glitter material in accordance with the present invention preferably is chosen such that the glitter material incorporated into the candle matrix burns cleanly and safely, and is visually appealing to consumers. Preferably, the glitter material is safe, substantially free of toxins and heavy metals, or comprised primarily of polyesters, copolyesters, silica, aluminum, and/or mica based materials.

With respect to heavy metal components, for example, those metals with a high relative atomic mass, preferably, suitable glitter materials will contain less than 10 parts per million (ppm) of such heavy metals. Such metals include arsenic, cadmium, lead, mercury, and, zinc.

When exposed to high heat and/or combustion associated with the ignition states of the candle, these metals may emit hazardous combustion and decomposition products. For example, prolonged exposure to heavy metal emissions may lead to temporary health problems such upper respiratory discomfort, headaches, nausea, vomiting, etc. Additionally, the presence of these metals in candle matrices may also lead to environmental pollution upon disposal of the used candle matrix. Since these metal ions may not fully be converted to gasses upon combustion during the ignition state of the candle, heavy metals may remain in the used candle matrix upon being discarded. Environmental problems associated with disposal of candles matrices containing heavy metals and carcinogens may include leaching of metal ions from the candle matrix into the soil as well as any water sheds associated thereto.

Suitable glitter formulations also preferably avoid polymer formulations containing unpolymerized monomers such that exposures to high heat and/or combustive environments is likely to emit the monomer as a combustion and/or decomposition product. Suitable glitters also preferably avoid carcinogenic materials, such as acrolein, metacrylic acid, acetaldehyde, and the like.

In accordance with one embodiment of the present invention, suitable glitter materials preferably include a substrate comprising primarily polyesters, copolyesters, silica, aluminum, and/or mica based materials.

For example, in one embodiment of the present invention, the suitable glitter formulation comprises polyester and/or copolyester materials. Suitable glitter formulations of this embodiment may be obtained by the Glitterex Corporation of 7 Commerce Drive, Cranford, N.J., in its DISCO HT™ series of glitter products. The DISCO HT™ series glitter material comprises primarily a combination of polyester and/or copolyester material and an acrylic copolymer. Small amounts of methyl methacrylate and amorphous silica are also present in this exemplary glitter material. The DISCO HT™ series glitter material is preferably incorporated into the candle matrix from approximately 0.0001–10% by weight of the entire candle composition without compromising safety, regulatory, and/or toxicity standards.

In another embodiment of the present invention, the glitter material comprises aluminum materials. Suitable glitter formulations of this embodiment may also be obtained by the Glitterex Corporation of 7 Commerce Drive, Cranford, N.J., under the brand name Alu*Flake™ According to the product MSDS, the Alu*Flake™ glitter material comprises Aluminum Foil 1145 Alloy, organic pigments, and a polyurethane coating. The Alu*Flake™ glitter material can be incorporated into the candle matrix up to approximately 0.001–10% by weight of the entire candle composition without compromising safety, regulatory, and/or toxicity standards.

In another embodiment of the present invention, the glitter material comprises a mica based material. Preferably, the mica based material is substantially free from heavy metals and may optionally include a titanium dioxide coating. Suitable formulations may be obtained by the Engelhard Corporation of Iselin, N.J., under the brand name Flamenco Ultra Sparkle 4500™, as well as EM Industries, Incorporated, of Hawthorne, N.Y., under the brand names Timiron MP-24 24 Karat Gold™, Timiron Super Gold™, Colorona Copper Sparkle™, Colorona Bordeux™, and Dichorona BG™. The above named mica-based glitter materials can be incorporated into the candle matrix up to approximately 0.0001–10% by weight of the entire candle composition without compromising safety, regulatory, and/ or toxicity standards.

The glitter material may be any color (e.g., silver, gold, blue, red, etc.), or even a mixture of colors. If pigment and/or dyes are added to the candle matrix, the glitter may be the same color as the pigment and/or dye, or a different color.

The glitter may also be of any dimensions that are suitable for a given candle matrix. The glitter is preferably less than about 0.05×0.05×0.005 cm (0.02×0.02×0.002 inches) in size, more preferably less than about 0.03×0.03×0.003 cm (0.01×0.01×0.001 inches) in size, and most preferably on the order of about 0.02×0.02×0.03 cm (0.008×0.008×0.001 inches) to about 0.002×0.002×0.001 cm (0.008×0.008× 0.0005 inches), or even about 0.01×0.01×0.001 cm (0.004× 0.004×0.005 inches) or less in size.

The glitter may be present in any suitable amount, preferably less than about 20% by weight of the total candle composition, more preferably in an amount from about 1–10% by weight of the total candle composition, and more preferably in an amount from about 0.001–0.1% by weight of the total candle composition.

Although current practice incorporates many types of extraneous materials in candles, such as coffee beans, dried botanicals, metal charms, rocks and minerals, plastic figurines, and the like, the glitter material used in the context of the present invention is not intended to encompass these types of materials.

Dispersion of the glitter material throughout the candle matrix may be uniform or nonuniform. For example, in one embodiment of the present invention, a clear candle matrix may have the glitter material substantially uniformly dispersed therein. In another embodiment, the glitter material may be dispersed in only a portion of the candle matrix, for example, on the outer surfaces of a free-standing candle, or on the visible portions of a candle formed within a container. The aesthetic options for the present invention are not limited to any particular configuration of the glitter material. In a preferred aspect of one embodiment of the present invention, the glitter material may be added near the set point of the candle matrix to discourage settling and promote a more uniform dispersion of the glitter material throughout the candle matrix.

The candle compositions of the present invention may also contain a variety of optional ingredients, For example, fragrance may be added in an amount selected so as to achieve the desired throwing power. The amount of fragrance may vary, but is typically less than 25% by weight of the total composition, and preferably less than about 15% by weight of the composition, and more preferably less than about 5% by weight of the composition. Those skilled in the art will note, however, that fragrance manufacturers may dilute the fragrance additives as supplied, thus allowing for the incorporation of what may appear to be a larger weight percentage of the fragrance additive into the composition. A wide variety of fragrances are available and useful in accordance with the present invention. Exemplary fragrances include floral, musk, fruity, spice, and earthy oil-soluble fragrances particularly formulated for use in candles. Suitable fragrances generally have a low affinity for water and are specifically tailored for use in petroleum- and/or resin-based candle compositions. Such fragrances are widely available, particularly from fragrance houses that supply fragrance compositions to manufacturers of consumer products.

Candle matrices useful in accordance with the present invention may also contain a coloring agent, which produces a desired color appearance. Coloring agents, such as dyes or pigments, can be utilized at a wide range of weight percentages of the total composition; small quantities of coloring agents are, however, usually sufficient to achieve desired color and intensity. In fact, those skilled in the art will recognize that an excessive amount of coloring agent in the candle matrix may lead to "clogging" of the candle wick during burning and potentially result in larger bloom. A wide variety of coloring agents are available and useful in accordance with the present invention.

The candle matrix may also include one or more of a variety of common candle additives. For example, UV inhibitors, such as CYASORB® UV-531 (available from American Cyanamid Co. of New Jersey), oxalamide derivatives, and 2-(2-hydroxy-5-tert-octylphenyl)-benzotriazole, may be added. Antioxidants, such as butylated hydroxytoluene, may also be added. Other common additives known to those skilled in the art may be used, for example, to increase hardness, improve clarity, improve gloss, increase strength, improve or retard crystal formation, and/or improve color and scent retention.

Any suitable wick design and wick material known to those skilled in the art may be utilized in accordance with the present invention. The number of wicks in each candle may vary, generally according to the size of the candle (i.e., smaller candles have 1 wick, larger candles may have multiple wicks). In addition, it is common in the industry to provide a metal clip at the base of each wick.

The processes by which candles of the present invention are manufactured are determined in large part by considering the weight of the glitter material and the ability of the candle matrix to suspend the material until the product is hardened. The processing parameters for each candle formulation may be adjusted individually, depending on the candle form (e.g., free-standing or poured into a container), size (e.g., height, diameter) and shape, the melt point of the candle composition, the set-up rate of the candle composition, and the overall hardening profile.

In an exemplary embodiment of the present invention, a free-standing votive-type candle is manufactured from a wax-based candle matrix. First, a specific blend of paraffin waxes, microcrystalline wax, and synthetic wax is melted and mixed together in a mixing vessel. Next, the balance of the desired candle matrix ingredients is added, except the desired fragrance, and the mixture is thoroughly blended. The desired fragrance is added at this point, then after mixing the matrix material thoroughly once again, the desired glitter material is incorporated by mixing. The mixing vessel is preferably kept under constant agitation, with a speed sufficient to continuously move the vessel contents. The molten candle matrix is then either filled into molds or may alternatively be prilled and compressed into the desired form.

In an alternative embodiment of the present invention, the glitter material may be added after the candle is formed from the matrix by incorporating the glitter material in a one- or two-step process. In a one-step process, the candle may be dipped or rolled in a wet or sticky blend of wax or fatty acid material and glitter, then allowed to set at room temperature. In a two-step process, the candle may be dipped or rolled in a sticky blend of waxes and/or fatty acid material, then dipped or rolled in the glitter material such that the glitter adheres to the sticky surface. In both processes, the coating material preferably will be solid at room temperature.

In a further embodiment of the present invention, a container-filled type candle is manufactured from a wax-based candle matrix. First, a specific blend of paraffin waxes, microcrystalline wax, and synthetic wax is melted and mixed together in a mixing vessel. Next, the balance of the desired candle matrix ingredients is added, except the desired fragrance, and the mixture is thoroughly blended. The desired fragrance is added at this point, then after mixing the matrix material thoroughly once again, the desired glitter material is incorporated by mixing. The mixing vessel is preferably kept under constant agitation, with a speed sufficient to continuously move the vessel contents. The molten candle matrix is then filled into containers, for example, into glass, plastic, clay, or metal cups or pots. Additional glitter material may be sprinkled on top of the candle matrix while the matrix is still hot or warm.

In a further embodiment of the present invention, a container-filled type candle is manufactured from a transparent, resin-based candle matrix. First, the desired resin material is gently melted and the desired amount of solvent is added. Mixing is preferably begun at this point and maintained throughout the process. Most preferably, a nitrogen "blanket" is utilized to prevent the resin material from yellowing during processing. The desired co-solvent, freezing-point depression agent (optional), and fatty acid (optional) are added and mixed until well blended. Next, optional ingredients such as coloring agents and/or UV inhibitors are thoroughly incorporated into the mixture. The desired fragrance, if any, is then added and the matrix is mixed thoroughly. As mixing continues, the desired type and amount of glitter material is added and the composition is blended until the glitter material is distributed as desired. Preferably, the glitter is substantially uniformly distributed throughout the matrix. The molten composition is then poured into the desired containers, and the candles are allowed to cool and solidify. Additional glitter material may be sprinkled on top of the candle matrix while the matrix is still hot or warm.

Various principles of the invention have been described in illustrative embodiments. However, many combinations and modifications of the above-described structures, arrangements, proportions, elements, materials and components, used in the practice of the invention, in addition to those not specifically described, may be varied and particularly adapted to specific environments and operating requirements without departing from those principles.

The following examples serve to further illustrate the present invention and are not intended to limit the scope of the invention.

EXAMPLE 1

An exemplary embodiment of the present invention comprising a transparent candle matrix and particular glitter material may be prepared as follows, with all percentages being weight percentages based on the total weight of the candle composition.

| Component | Preferred Range |
| --- | --- |
| UNICLEAR ® 80 | 25–35% |
| light mineral oil N.F. | 30–40% |
| capric/Caprylic Triglyceride | 25–30% |
| Hexylene Glycol | 0–10% |
| Myristoc Acid | 0–10% |
| U.V. absorbers | 0–10% |
| dyes/colorant | 0.000000001–0.1% |
| glitter - DISCO HT ™ or Alu*Flake ™ | 0.0001–10% |
| perfume/fragrance | 0.001–25% |

EXAMPLE 2

An exemplary embodiment of the present invention comprising an opaque, free-standing type candle matrix and particular glitter material may be prepared as follows, with all percentages being weight percentages based on the total weight of the candle composition.

| Component | Preferred Range |
| --- | --- |
| fully refined paraffin wax | 49–99% |
| microcrystalline wax | 0.1–50% |
| synthetic wax, polymerized alkenes | 0–10% |
| butylated hydroxytoluene | 0–0.1% |
| U.V. absorbers | 0–10% |
| dyes/colorant | 0–0.1% |
| glitter - DISCO HT ™ or Alu*Flake ™ | 0.0001–20% |
| perfume/fragrance | 0.001–25% |

EXAMPLE 3

An exemplary embodiment of the present invention comprising an opaque, container-type candle matrix and particular glitter material may be prepared as follows, with all percentages being weight percentages based on the total weight of the candle composition.

| Component | Preferred Range |
| --- | --- |
| petroleum based waxes | 0–99% |
| microcrystalline wax | 0.1–50% |
| synthetic wax, polymerized alkenes | 0–10% |
| butylated hydroxytoluene | 0–0.1% |
| U.V. absorbers | 0–10% |
| dyes/colorant | 0.000000001–0.1% |
| glitter - DISCO HT ™ or Alu*Flake ™ | 0.0001–10% |
| perfume/fragrance | 0.001–25% |

EXAMPLE 4

An exemplary embodiment of the present invention comprising an opaque, container-type candle matrix and particular glitter material may be prepared as follows, with all percentages being weight percentages based on the total weight of the candle composition.

| Component | Preferred Range |
| --- | --- |
| crude scale wax | 58–990% |
| fully refined paraffin wax | 0–30% |
| microcrystalline wax | 0.5–10% |
| synthetic wax, polymerized alkanes | 0–1% |
| antioxidant (butylated hyrdroxytoluene) | 0–0.01% |
| U.V. absorbers | 0–10% |
| dyes/colorant | 0.000000001–0.1% |
| glitter - DISCO HT ™ or Alu*Flake ™ | 0.0001–10% |
| perfume/fragrance | 0.001–25% |

EXAMPLE 5

An exemplary embodiment of the present invention comprising a transparent candle matrix and particular glitter material may be prepared under a batch-type process as follows, with all percentages being weight percentages based on the total weight of the candle composition. The batch-type process comprised preparation of the invention in a two-stage process comprising a premix step (tank) and a main batch step (tank).

A premix solution comprising Uniclear 80, Mineral Oil, and Capric/Caprylic fatty acid was prepared in a premix tank. Uniclear 80 was added to a suitably sized premix tank, heated to approximately 225° F., whereupon mixing was initiated. Mineral Oil was then added while mixing and heating continued. Capric/Caprylic fatty acid was then added while mixing and heating continued. When the premix was fully melted and appeared homogenous, the temperature was reduced to 185–190° F. The premix was then transferred to the main batch tank through a 75 micron filter. A nitrogen blanket was then applied to help prevent yellowing.

A main batch was prepared by first adding the premix into the main batch tank, where the tank was pre-heated to 185–190° F. and mixing initiated upon premix addition. Mystric acid was added, while heating and mixing continued. Hexylene glycol was then added while heating and mixing continued. UV inhibitors were added, while mixing continued. Appropriate glitter material and dyes were then added, whereupon mixing continued for an additional 10 minutes. The batch was then cooled to approximately 160° F.

The candle was then poured to into an appropriate mold.

Thus, while the principles of the invention have been described in illustrative embodiments, many combinations and modifications of the above-described structures, arrangements, proportions, the elements, materials, and components, used in the practice of the invention in addition to those not specifically described may be varied and particularly adapted for a specific environment and operating requirement without departing from those principles.

We claim:

1. A glitter candle composition comprising a substantially clear, non-paraffin, ester-terminated polyamide resin candle matrix material and an aluminum glitter material present in an amount from about 0.0001% to about 0.1% by weight of the total glitter candle composition, said aluminum glitter material suspended throughout an interior volume of the glitter candle, wherein said aluminum glitter material does not produce noxious or harmful emissions and is substantially free of heavy metals.

2. The glitter candle composition of claim 1, wherein the heavy metals comprise at least one of arsenic, cadmium, lead, mercury, and zinc.

3. The glitter candle composition of claim 1, wherein said aluminum glitter material is substantially free from carcinogens.

4. The glitter composition of claim 3, wherein the carcinogens comprise acrolein, metacrylic acid, and acetaldehyde.

* * * * *